US008225026B2

(12) United States Patent
Ren

(10) Patent No.: US 8,225,026 B2
(45) Date of Patent: Jul. 17, 2012

(54) DATA PACKET ACCESS CONTROL APPARATUS AND METHOD THEREOF

(75) Inventor: Kai Ren, Beijing (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 111 days.

(21) Appl. No.: 12/851,182

(22) Filed: Aug. 5, 2010

(65) Prior Publication Data

US 2011/0040923 A1    Feb. 17, 2011

(30) Foreign Application Priority Data

Aug. 13, 2009  (CN) .......................... 2009 1 0091229

(51) Int. Cl.
*G06F 12/00*   (2006.01)
(52) U.S. Cl. .................................. 711/5; 711/E12.079
(58) Field of Classification Search ........................ None
See application file for complete search history.

(56) References Cited

U.S. PATENT DOCUMENTS

| | | | | |
|---|---|---|---|---|
| 5,448,709 A | * | 9/1995 | Chandler et al. ................. | 710/52 |
| 5,455,954 A | * | 10/1995 | Packer ............................ | 710/74 |
| 5,469,548 A | * | 11/1995 | Callison et al. ................ | 711/114 |
| 5,657,465 A | * | 8/1997 | Davidson et al. ............. | 712/201 |
| 5,675,757 A | * | 10/1997 | Davidson et al. ............. | 712/201 |
| 7,099,231 B2 | * | 8/2006 | Au et al. ................... | 365/230.04 |
| 7,126,959 B2 | * | 10/2006 | Van Asten et al. ............. | 370/429 |
| 7,296,112 B1 | * | 11/2007 | Yarlagadda et al. ........... | 711/105 |
| 7,554,978 B1 | * | 6/2009 | Parker ........................... | 370/389 |
| 2007/0011396 A1 | * | 1/2007 | Singh et al. ................... | 711/105 |

OTHER PUBLICATIONS

Leonardo Balliache, "The Router Queues", Sep. 10, 2003, http://opalsoft.net/qos/WhyQoS.htm http://opalsoft.net/qos/WhyQos-241.htm.*

* cited by examiner

*Primary Examiner* — Edward Dudek, Jr.
*Assistant Examiner* — Christopher Birkhimer
(74) *Attorney, Agent, or Firm* — Ladas & Parry LLP

(57) ABSTRACT

A data packet access control apparatus and a data packet access control method are disclosed. RAM resources in a data packet processing chip are used to implement a Bypass FIFO. The Bypass FIFO is used as a first-level cache for small amount of data, and an external RAM of the data packet processing chip is used as a second-level cache for large amount of data. In this way, some data packets are read and written within the chip and not all data packets have to be read and written through the external RAM. A data packet reading/writing operation may be performed to the external RAM by a BANK interleave mode.

24 Claims, 10 Drawing Sheets

DATA PACKET ACCESS CONTROL APPARATUS AND METHOD THEREOF

FIELD OF THE INVENTION

The present invention relates to storage control technologies, and more particularly to a data packet access control apparatus and a data packet access control method applicable for a storage-forwarding mechanism.

BACKGROUND OF THE INVENTION

Most current network devices are based on a storage-forwarding mechanism, i.e. a data packet is firstly stored in a network device after entering into the network device and then being read out and forwarded after the network device performs an operation, e.g. finding a next-hop.

Generally, a data packet to be forwarded may be accessed in the network device for many times. Thus, the efficiency of the network device for accessing the data packet greatly affects data packet transmission efficiency. For example, the data packet is firstly stored in an ingress linecard waiting for routing forwarding search, then is read out and transmitted to an egress linecard through a backplane switched network and is stored in the egress linecard waiting for a QoS scheduling. A data packet meeting QoS requirements will be read out and transmitted. Therefore, in order to improve the data packet transmission efficiency, the network device needs to meet the following demands when the data packet is accessed.

1) The storage capacity of the network device for storing data packets should be larger than or equal to RTT×R bits, wherein RTT (Round Trip Time) denotes a line round trip time on the linecard, and R denotes a line rate on the linecard. Suppose RTT is 200 ms, a network device with a 10 Gbit interface needs to have a storage capacity of 10 Gbit/s×0.2 s, i.e. a storage capacity of 2 Gbit.

2) The network device needs to have high bandwidth for accessing data packets. Suppose a network device with a 10 Gbit interface needs to access each data packet twice, the network device needs to have an access capacity of 20 Gbit bandwidth.

In practical applications, a data packet processing chip in the network device is usually an Application Specific Integrated Circuit (ASIC) chip or a Field Programmable Gate Array (FPGA) chip, whose storage capacity cannot meet the storage requirements of data packets. In order to meet the storage requirements, as shown in FIG. 1, a Random Access Memory (RAM) with high bandwidth and a large storage capacity is usually externally connected with the data packet processing chip of each linecard in the storage-forwarding based network device. Referring to FIG. 2, a control logic is configured in the data packet processing chip. It stores data packets received by the data packet processing chip into the RAM in turn according to a queue management mechanism of a First-In-First-Out (FIFO) storage, reads data packets out of the RAM in turn and transmits the data packets to the data packet processing chip.

Among most RAMs, Double Data Rate 2 (DDR2) Synchronous Dynamic Random Access Memory (SDRAM) and Double Data Rate 3 (DDR3) SDRAM are often selected for their larger capacity, higher rate and lower price.

However, even if the DDR2 SDRAM or the DDR3 SDRAM with larger capacity and higher rate are selected to store data packets, continuous reading/writing operations of the data packets may be restricted due to some features of the DDR2 SDRAM and the DDR3 SDRAM. For example, when accessing different rows in a same BANK of the DDR2 SDRAM, a delay between successive active (ACT) commands to two rows will result in a bus idle of the DDR2 SDRAM; when accessing any row in any BANK of the DDR2 SDRAM, e.g. a read operation or a Precharge operation on the row, may also result in the bus idle of the DDR2 SDRAM.

However, the existing control logic for accessing data packets does not consider how to avoid an effect of the above restriction on the data packet accessing efficiency. It performs a random reading/writing operation to the DDR2 SDRAM and the DDR3 SDRAM, and thus cannot meet the high bandwidth requirements for accessing the data packets.

Referring to FIG. 3, take the reading of data packets in a burst mode as an example. The control logic continuously reads data packets from different rows in the same BANK of an external DDR2 SDRAM.

At clock cycle T0, an ACT command is transmitted to the external DDR2 SDRAM to activate a row in the BANK of the external DDR2 SDRAM.

At clock cycle T1, an RD command is issued to the external DDR2 SDRAM, and the external DDR2 SDRAM starts a read operation to the row in the BANK.

At clock cycles T2~T3, the external DDR2 SDRAM continues the read operation to the row in the BANK.

At clock cycle T4, wait for the external DDR2 SDRAM to perform a Precharge operation to close the row.

At clock cycles T5~T6, the external DDR2 SDRAM outputs the read data packet through a bus.

At clock cycle T7, wait for a delay between successive ACT commands of two rows.

At clock cycle T8, an ACT command is issued to the external DDR2 SDRAM again to activate a next row in the BANK of the external DDR2 SDRAM.

At the 8 clock cycles from T0~T7 in the above procedure, the bus of the DDR2 SDRAM is occupied only at 2 clock cycles from T5~T6, the bus usage ratio during the continuous read operations is only 25%. It is similar for continuous write operations. Moreover, a switch between the read operation and the write operation will result in bus idle of different clock cycles due to the features of different DDR2 SDRAMs, i.e. the bus usage ratio is lower when the read operation and the write operation are performed alternately. In addition, after a row is activated at clock cycle T0, a read command may be issued to the row at clock cycle T1 after 0 clock cycle is delayed subject to a pre-configured parameter tRCD of the DDR2 SDRAM, and data packets are read out through the bus of the DDR2 SDRAM after 4 clock cycles are delayed subject to parameters AL and CL. In practical applications, after a row is activated at clock cycle T0, the read operation to the row may be performed after at least one clock cycle delay through configuring the parameter tRCD because the bus rate of the DDR2 SDRAM is high, or the delay of reading data from the bus may be further prolonged through configuring the parameters AL and CL. In this way, the bus usage ratio is further decreased. As to the write operation, the situation is similar.

As can be seen from the above, the existing storage-forwarding based network device can use the RAM to meet the storage requirements of data packets, but the control logic cannot meet the high bandwidth requirements for accessing data packets, thereby affecting the data packet accessing efficiency under the storage-forwarding mechanism.

SUMMARY OF THE INVENTION

In view of the above, embodiments of the present invention provide a data packet access control apparatus and a data packet access control method applicable for a storage-forwarding mechanism, which can improve a data packet transmission efficiency under the storage-forwarding mechanism.

According to an embodiment of the present invention, a data packet access control apparatus applicable for the storage-forwarding mechanism is provided. The apparatus is communicatively connected with an external Random Access Memory (RAM) having a plurality of external queues, the apparatus includes:

an ingress queue unit, configured with a plurality of ingress queues;

an egress queue unit, configured with a plurality of egress queues; wherein each ingress queue is uniquely corresponding to an the egress queue, and each pair of ingress queue and egress queue is uniquely corresponding to an external queue in the external RAM;

a memory control unit, adapted to respectively store data packets of the ingress queues into their corresponding external queues in the external RAM, and to respectively read data packets to be stored in the egress queues from the corresponding external queues in the external RAM;

a Bypass FIFO, adapted to cache data packets of the ingress queues and transmit the data packets to the corresponding egress queues;

an ingress control unit, adapted to provide a data packet in an ingress queue to the memory control unit if the ingress queue is non-empty and a corresponding external queue has a data packet and is non-full; to write the data packet in the ingress queue into the Bypass FIFO if a corresponding external queue is empty and the Bypass FIFO and a corresponding egress queue are both non-full; to provide the data packet in the ingress queue to the memory control unit if the corresponding external queue is empty and the Bypass FIFO or the corresponding egress queue is afull or full; and to perform no reading/writing operation for the ingress queue if the external queue is full; and an egress control unit, adapted to read a data packet from the Bypass FIFO and store the data packet into an egress queue if the Bypass FIFO is non-empty; to request the memory control unit to read a data packet from a corresponding external queue and store the data packet into the egress queue if the Bypass FIFO is empty and the egress queue is non-full and the corresponding external queue is non-empty; and to perform no reading/writing operation for the egress queue if the Bypass FIFO is empty and the corresponding external queue has no data packet.

According to another embodiment of the present invention, a data packet access control method applicable for the storage-forwarding mechanism is provided. The method is applicable for writing data packets received by a chip into an external Random Access Memory (RAM), and for reading data packets from the external RAM to the chip and transmitting the data packets out, wherein a plurality of ingress queues, a plurality of egress queues and a Bypass FIFO is configured in the chip, the external RAM is configured with a plurality of external queues, each ingress queue is uniquely corresponding to an the egress queue, and each pair of ingress queue and egress queue is uniquely corresponding to an external queue in the external RAM, the method includes:

if an ingress queue is non-empty,
if a corresponding external queue has a data packet and is non-full, providing, by an ingress control unit, a data packet in the ingress queue to a memory control unit;
if an external queue corresponding to the ingress queue is empty, and the Bypass FIFO and a corresponding egress queue are both non-full, writing the data packet in the ingress queue into the Bypass FIFO;
if the external queue corresponding to the ingress queue is empty, and the Bypass FIFO or the corresponding egress queue is afull or full, providing the data packet in the ingress queue to the memory control unit; and
if the external queue is full, performing no reading/writing operation for the ingress queue;

if the Bypass FIFO is non-empty, reading, by an egress control unit, a data packet from the Bypass FIFO and storing the data packet into the egress queue;
if the Bypass FIFO is empty, an egress queue is non-full and an external queue corresponding to the egress queue is non-empty, reading a data packet from the external queue and store the data packet into the egress queue; and
if the Bypass FIFO is empty and the corresponding external queue has no data packet, performing no reading/writing operation for the egress queue.

As can be seen from the above technical scheme, in embodiments of the present invention, a Bypass FIFO is used as a first-level cache for small amount of data, and an external RAM is used as a second-level cache for large amount of data. In this way, some data packets are read and written within the chip and not all data packets are read and written through the external RAM, which lowers the effect of low bus usage ratio of the external RAM on the data packet transmission efficiency, and thus improves the data packet transmission efficiency.

DETAILED DESCRIPTION OF THE INVENTION

In order to make the technical scheme and merits of the present invention clearer, the present invention will be described in detail hereinafter with reference to accompany drawings and embodiments.

In embodiments of the present invention, considering that an ASIC chip or an FPGA chip is usually adopted as a data packet processing chip, and inside the chip, there always have RAM resources which can be configured arbitrarily, in order to make an external RAM affect the data packet transmission efficiency as less as possible, the RAM resources in the data packet processing chip are used to implement a Bypass FIFO. The Bypass FIFO functions as a first-level cache for small amount of data, and the external RAM of the data packet processing chip is used as a second-level cache for large amount of data.

The function of the above Bypass FIFO is to bypass a data packet transmission path passing through a bus of the external RAM.

Figure 1:
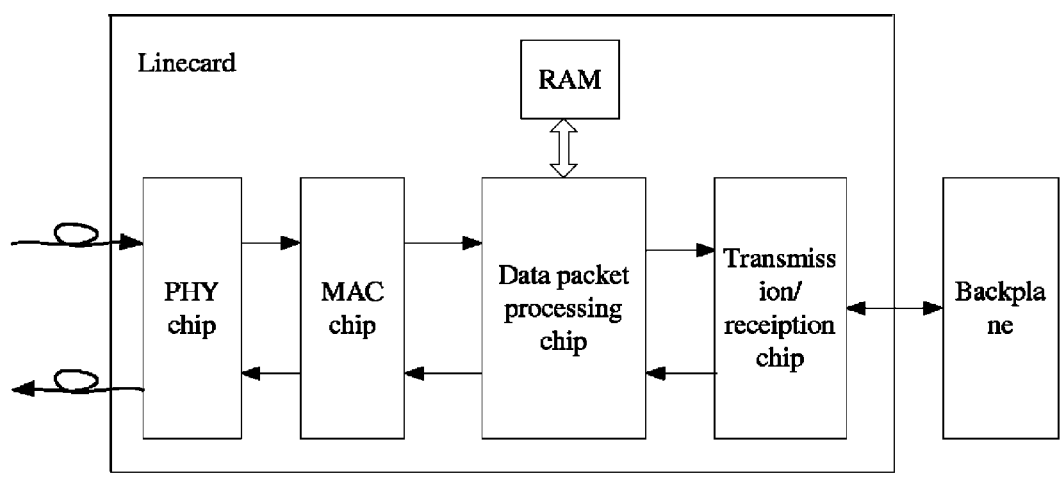
FIG. 1 is a schematic diagram illustrating a structure of a linecard in a network device based on a storage-forwarding mechanism in the prior art.
Figure 2:
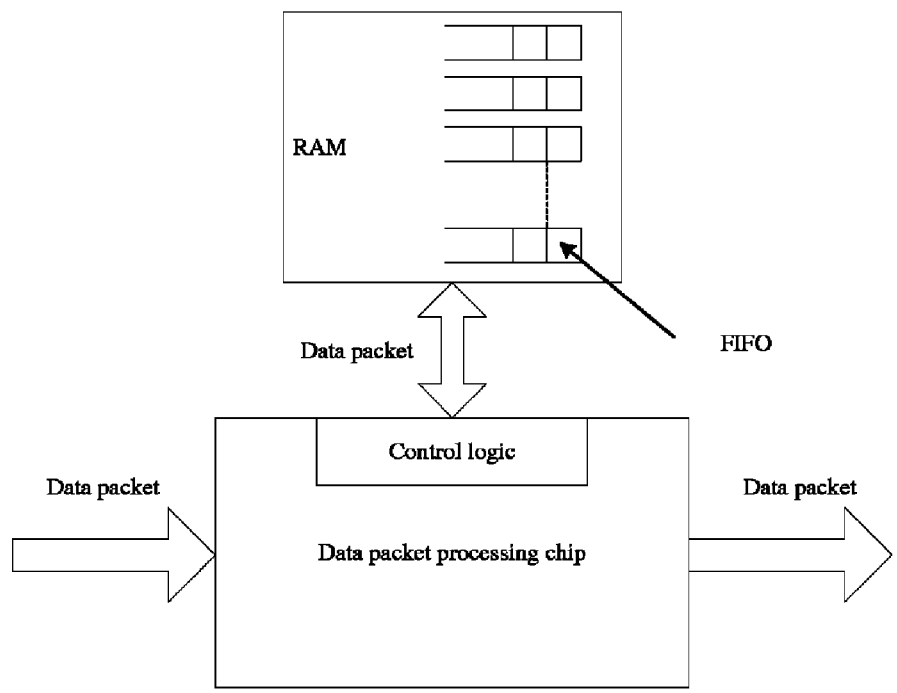
FIG. 2 is a schematic diagram illustrating a FIFO queue management mechanism in the linecard shown in FIG. 1 in the prior art.
Figure 3:
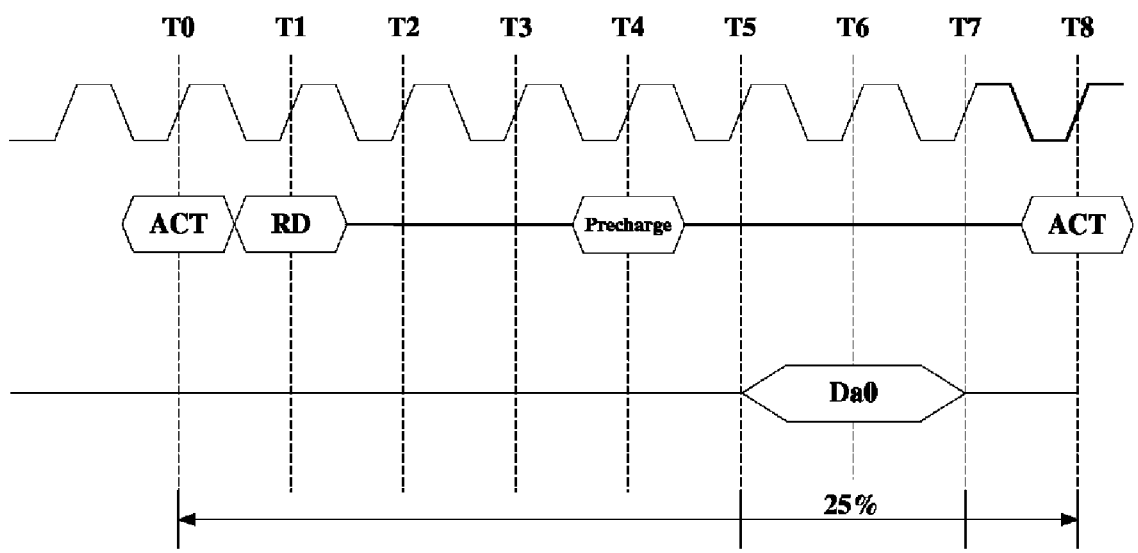
FIG. 3 is a time sequence diagram of a control logic reading an external RAM in the prior art.
Figure 4:
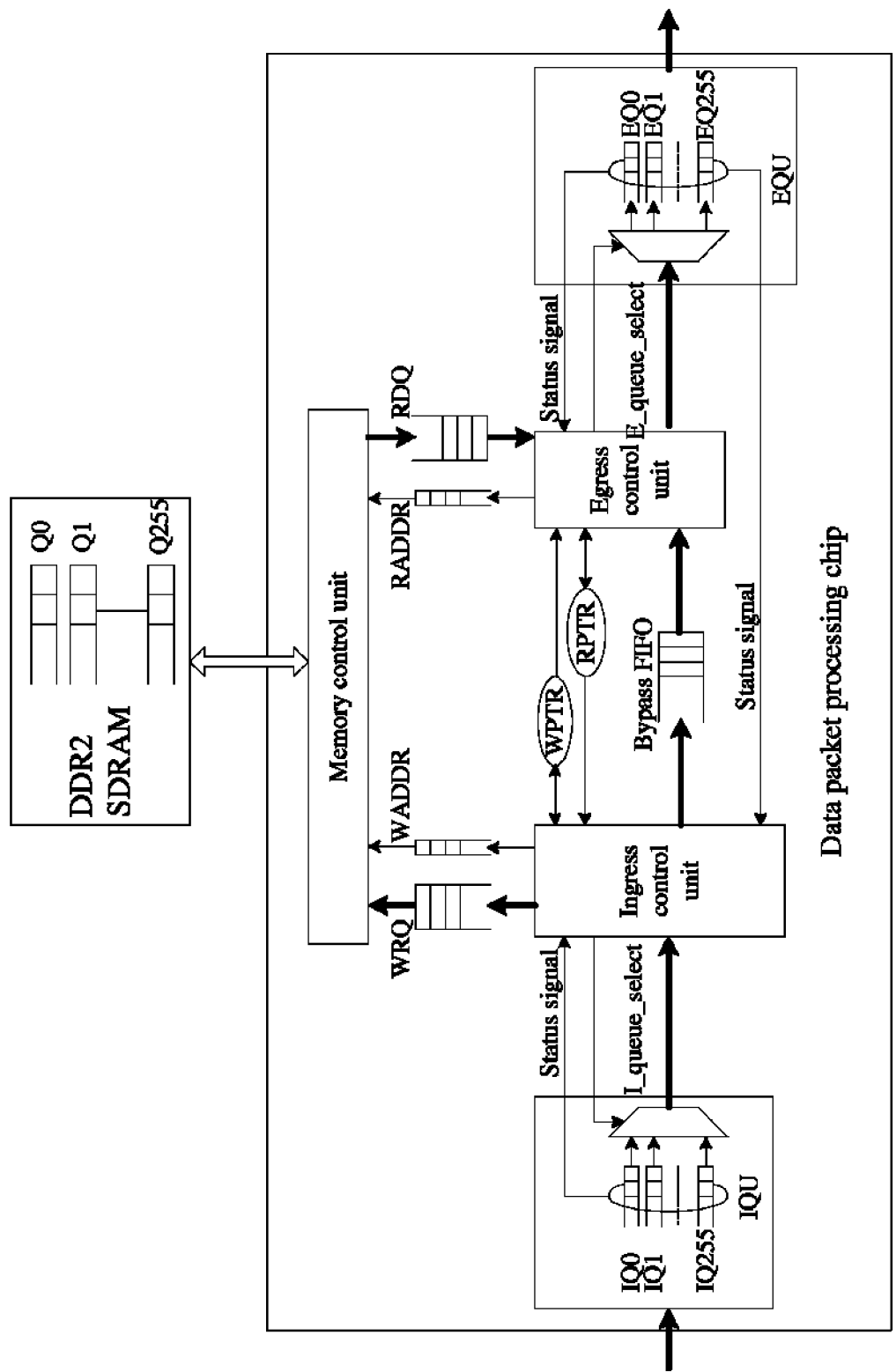
FIG. 4 is a schematic diagram illustrating a structure of a data packet access control apparatus according to an embodiment of the present invention.

FIG. 4 is a schematic diagram illustrating a structure of a data packet access control apparatus according to an embodiment of the present invention. As shown in FIG. 4, a DDR2 SDRAM is taken as an exemplary external RAM, and a data packet processing chip is taken as the data packet access control apparatus. The data packet access control apparatus includes the following units.

An Ingress Queue Unit (IQU), in which multiple ingress queues IQ1~IQ255 are configured, and each ingress queue IQi may store multiple data packets of a same packet stream received from external of the data packet access control apparatus.

An Egress Queue Unit (EQU), in which multiple egress queues EQ1~EQ255 are configured, and each egress queue EQi may store multiple data packets of a same packet stream received from an ingress queue corresponding to the egress queue and wait for transmitting the data packets out of the data packet access control apparatus.

Herein, i is a positive integer from 1 to 255. Of cause, the number of the ingress queues and the number of the egress queues may be not limited to 255 but larger.

A memory control unit (DDR2 SDRAM Controller), adapted to perform a data packet reading/writing operation to the external DDR2 SDRAM based on a FIFO queue management mechanism. Specifically, the DDR2 SDRAM Controller may store a data packet of an ingress queue IQi into a corresponding external queue Qi in the external DDR2 SDRAM, and may read a data packet to be stored in an egress queue EQi from a corresponding external queue Qi in the external DDR2 SDRAM.

A Bypass FIFO, adapted to cache a data packet of an ingress queue IQi and transmit the data packet to an egress queue EQi corresponding to the ingress queue IQi.

An ingress control unit and an egress control unit.

The ingress control unit is adapted to determine, when an ingress queue IQi is non-empty, whether a corresponding external queue Qi in the external DDR2 SDRAM stores a data packet.

If the corresponding external queue Qi in the external DDR2 SDRAM stores a data packet and is non-full, it indicates that a data packet in a packet stream corresponding to the ingress queue IQi has been stored in the external queue Qi and the external queue Qi can keep on storing data packets. Thus, in order to guarantee that sequences of data packets in the packet stream corresponding to the ingress queue IQi will not change, the data packet in the packet stream in the ingress queue IQi is provided to the memory control unit, so that the data packet in the IQi is transmitted through a second-level cache path including the IQi, the Qi in the external DDR2 SDRAM and the EQi. It should be noted that the expression "non-full" herein means that the external queue Qi is not in an afull or full state.

If the corresponding external queue Qi in the external DDR2 SDRAM is empty, determine whether the Bypass FIFO and the egress queue EQi corresponding to the ingress queue IQi are both non-full.

If the corresponding external queue Qi in the external DDR2 SDRAM is empty and the Bypass FIFO and the egress queue EQi corresponding to the ingress queue IQi are both non-full, it indicates that the packet stream corresponding to the ingress queue IQi has no data packet stored in the external queue Qi and the data packet can be transmitted to the egress queue EQi through the Bypass FIFO. Thus, the data packet in the ingress queue IQi is written into the Bypass FIFO, so that the data packet in the ingress queue IQi is transmitted through a first-level cache path including the IQi, the Bypass FIFO and the EQi.

If the corresponding external queue Qi in the external DDR2 SDRAM is empty and the Bypass FIFO or the egress queue EQi corresponding to the ingress queue IQi is afull or full, the data packet in the ingress queue IQi is provided to the memory control unit, so that the data packet in the ingress queue IQi is transmitted through a second-level cache path including the IQi, the Qi in the external DDR2 SDRAM and the EQi.

Otherwise, if the corresponding external queue Qi stores data packets but is full, the reading/writing operation will not be performed to the ingress queue IQi for the moment.

The egress control unit reads a data packet from the Bypass FIFO when the Bypass FIFO is non-empty and stores the data packet into an egress queue EQi corresponding to the ingress queue IQi to which the data packet belongs. Since the data packet in the Bypass FIFO is written when the external queue Qi has no data packet in a packet stream corresponding to the ingress queue IQi and when the egress queue EQi corresponding to the ingress queue IQi is non-full, the external queue Qi has no other data packet which is in the same packet stream and should be located prior to the data packet. Even if the external queue Qi has a data packet in the same packet stream when a data packet is read from the Bypass FIFO, since the read data packet is not stored in the Bypass FIFO when the external queue Qi has a data packet in the same packet stream, the data packet in the external queue Qi must be later the data packet read from the Bypass FIFO, so that a data packet can be read from the Bypass FIFO as long as the Bypass FIFO is non-empty. In this way, the sequences of data packets in the packet stream corresponding to the ingress queue IQi will not change.

When the Bypass FIFO is empty, if the egress queue EQi is non-full and a corresponding external queue Qi in the external DDR2 SDRAM is non-empty, it indicates that the sequences of data packets in a packet stream corresponding to the egress queue EQi will not change if a data packet is read from the external queue Qi. Thus, the egress control unit requests the memory control unit to read a data packet from the external queue Qi in the external DDR2 SDRAM, and stores the data packet into the egress queue EQi. Otherwise, if the Bypass FIFO is empty and the external queue Qi has no data packet, the reading/writing operation will not be performed to the egress queue EQi for the moment.

As can be seen from the above, since some data packets are transmitted through the first-level cache path within the data packet access control apparatus, and not all of the data packets are transmitted through the second-level cache path in which the bus of the external DDR2 SDRAM is located, the effect of the low bus usage ratio of the DDR2 SDRAM on the data packet transmission efficiency is reduced.

Moreover, since the first-level cache path in the data packet access control apparatus will not be selected when the external queue Qi corresponding to the egress queue EQi has a data packet, it can be guaranteed that the sequences of the data packets in the packet stream will not change. Since the first-level cache path in the data packet access control apparatus will also not be selected when the egress queue EQi is afull or full, a following situation may be avoided: after the ingress control unit reads a data packet from the ingress queue IQi and writes the data packet into the Bypass FIFO, even if the egress control unit reads from the Bypass FIFO the data packet which belongs to the IQi and should have been stored into the EQi, the read data packet will be lost because the EQi is afull or full and has no enough space to write the data packet.

In practical applications, the data packet read from the IQi should be written into the EQi corresponding to the IQi, rather than egress queues from EQ1 to EQi−1 or from EQi+1 to EQ255. Thus, the ingress control unit should add an identifier of IQi to the data packet read from the IQi, so that the egress control unit can determine the IQi to which the data packet belongs according to the identifier and store the data packet into the EQi corresponding to the IQi.

Figure 5:
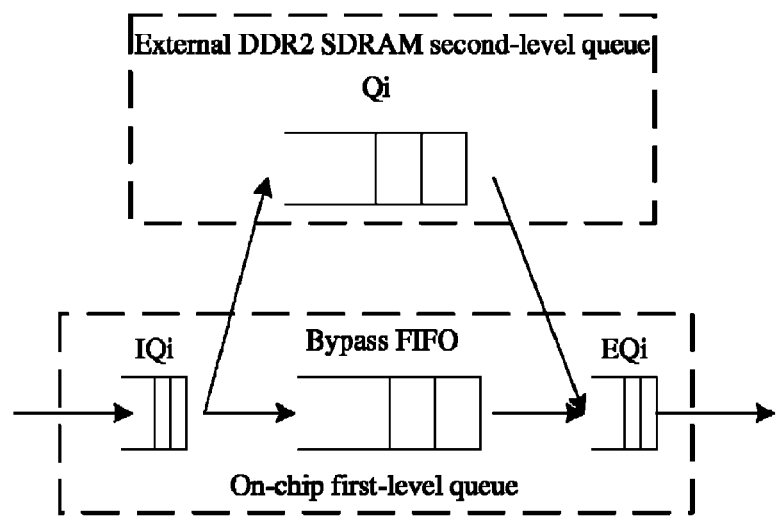
FIG. 5 is a schematic diagram illustrating a logic structure of a data packet access control logic according to an embodiment of the present invention.

FIG. 5 is a schematic diagram illustrating a logic structure of a data packet access control logic according to an embodiment of the present invention. As shown in FIG. 5, in the embodiment, an ingress queue IQi and a corresponding egress queue EQi which are connected through a Bypass FIFO consist a first-level cache path, and an external queue Qi which is in an external DDR2 SDRAM and corresponds to the ingress queue IQi belongs to a second-level cache path.

Hereinafter, the data packet access control apparatus shown in FIG. 4 will be described in detail.

In order to avoid a situation that data packets in an ingress queue in the IQU are not read by the ingress control unit for a long time, the ingress control unit may read data packets in multiple ingress queues in a round robin manner. A specific implementation is as follows.

Referring to FIG. 4, an ingress selector including multiple inputs and one output is further configured in the IQU. Each input of the ingress selector is connected with one ingress queue, and the output is connected with the ingress control unit. The allocation of data packets received by the IQU to multiple ingress queues may be implemented by those skilled in the art through any method and will not be described herein.

The ingress control unit outputs an ingress round robin control signal (I_queue_select) to a control end of the ingress selector, so as to control to connect each input of the ingress selector with the output of the ingress selector in a round robin manner. Thus, the data packets in the multiple ingress queues are read in the round robin manner.

Accordingly, in order to make the egress control unit averagely allocate the obtained data packets to multiple egress queues in the EQU, so as to avoid that data packets stack in several egress queues resulting in decrease of the data packet transmission efficiency, in this embodiment, the egress control unit may write data packets into multiple egress queues in the round robin manner. A specific implementation is as follows.

An egress selector including one input and multiple outputs is further configured in the EQU. Each output of the egress selector is connected with one egress queue, and the input is connected with the egress control unit. The selection of an egress queue among multiple egress queues by the EQU may be implemented in any manner by those skilled in the art and will not be described herein.

The egress control unit outputs an egress round robin control signal (E_queue_select) to a control end of the egress selector, so as to control to connect each output of the egress selector with the input of the egress selector in a round robin manner. Thus, the data packets are written into multiple egress queues in the round robin manner.

Still referring to FIG. 4, in order to enable the ingress control unit to determine whether an ingress queue is non-empty, each ingress queue may further output a status signal (I_queue_status) indicating the status of the ingress queue to the ingress control unit. In order to enable the egress control unit to determine whether an egress queue is non-full and enable the ingress control unit to determine whether the egress queue is non-full, each egress queue may further output a status signal (E_queue_status) indicating the status of the egress queue to the egress control unit and the ingress control unit.

Still referring to FIG. 4, in order to enable the ingress control unit and the egress control unit to determine the status of each external queue in the external DDR2 SDRAM, enable the ingress control unit to make the memory control unit write a data packet into a corresponding external queue, and enable the egress control unit to make the memory control unit correctly read a data packet from a corresponding external queue, in the embodiment, the ingress control unit further maintains an external memory write pointer list (WPTR List), and the egress control unit maintains an external memory read pointer list (RPTR List).

In this way, the ingress control unit is further connected with the memory control unit through a write data output queue (WRQ) and a write address output queue (WADDR). The ingress control unit stores a data packet to be provided to the memory control unit into the WRQ, stores a current write pointer WPTRi corresponding to an ingress queue IQi to which the data packet belongs into the WADDR, and updates the WPTRi. The method for updating the WPTRi may include: calculate a total address occupied by the data packet, and update the WPTRi through adding the total address to the current WPTRi.

The egress control unit is further connected with the memory control unit through a read data input queue (RDQ) and a read address output queue (RADDR). The egress control unit stores a read pointer RPTRi which is in the external memory read pointer list and corresponds to an egress queue EQi in a non-full state into the RADDR, updates the RPTRi, and then reads a data packet from the RDQ. The method for updating the RPTRi includes: calculate a total address occupied by the data packet read out, and update the RPTRi through adding the total address to the current RPTRi.

The ingress control unit and the egress control unit may compare a read pointer and a write pointer of each external queue according to the external memory write pointer list and the external memory read pointer list in any manner to determine the status of each external queue in the external DDR2 SDRAM.

Hereinafter, a working principle of the data packet access control apparatus shown in FIG. 4 will be described in detail with reference to some instances.

Figure 6:
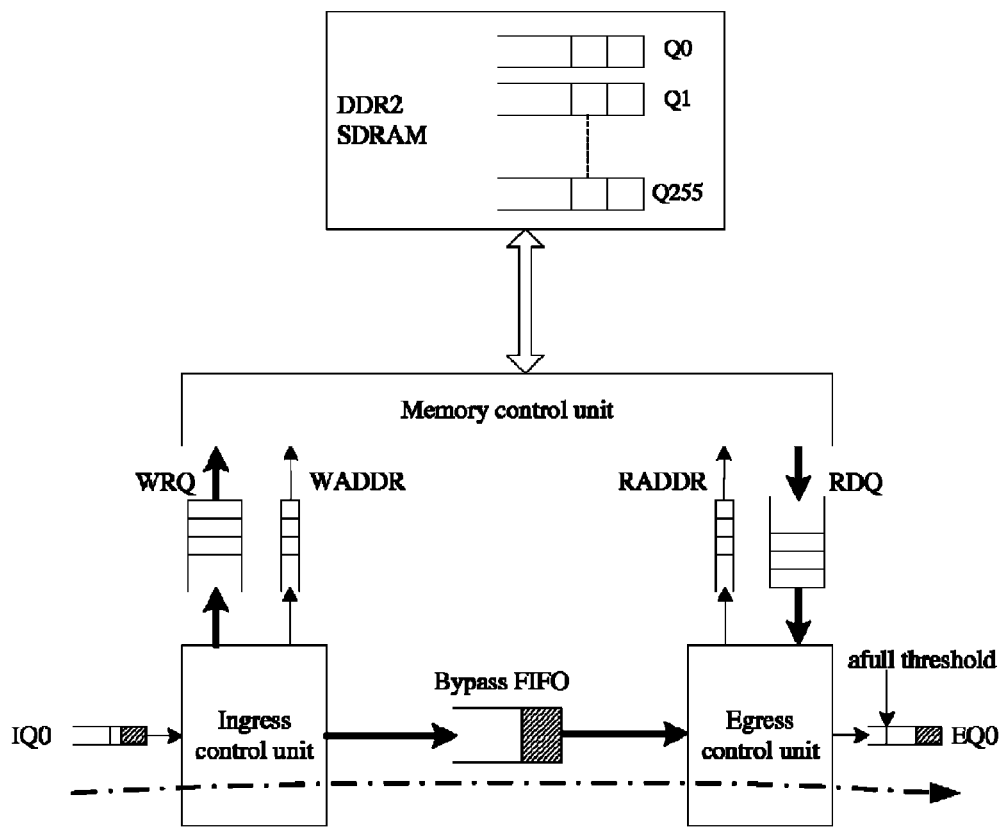
FIG. 6 is a schematic diagram illustrating an example of data packet access control according to an embodiment of the present invention.

Referring to FIG. 6, signal transmissions between units are omitted, and a data packet transmission path is shown by a dashdotted line. The ingress control unit performs a Round Robin (RR) scheduling operation. When the IQ0 is scheduled, if the IQ0 has a data packet, an external queue Q0 corresponding to the IQ0 has no data packet and the EQ0 corresponding to the IQ0 among multiple egress queues does not reach an afull threshold and the Bypass FIFO also does not reach an afull state or a full state, it indicates that an on-chip data packet transmission path sequentially consist of the IQ0, the Bypass FIFO and the EQ0 is not congested, and the sequences of data packets in a packet stream to which the data packets belong will not change if the data packets are transmitted through the path. Thus, the ingress control unit reads a data packet in the IQ0, writes the data packet into the Bypass FIFO, and adds an identifier of the IQ0 to the data packet. Afterwards, after reading the data packet with the identifier of the IQ0 from the Bypass FIFO, the egress control unit may write the data packet into the EQ0 which does not reach the afull state or the full state.

Figure 7A:
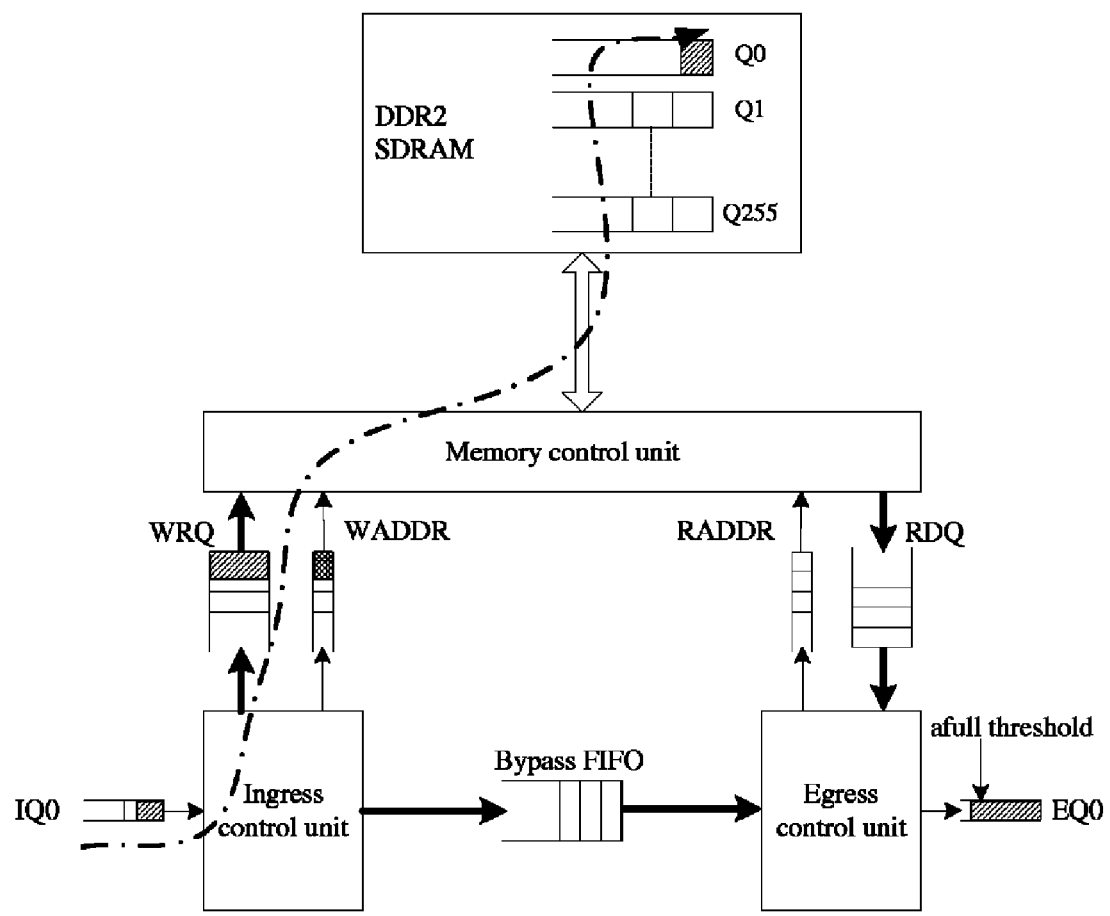
FIG. 7a~FIG. 7b are schematic diagrams illustrating another example of data packet access control according to an embodiment of the present invention.

Referring to FIG. 7a, signal transmissions between units are omitted, and a data packet transmission path is shown by a dashdotted line. The ingress control unit performs an RR scheduling operation to the multiple ingress queues. When the IQ0 is scheduled, if the IQ0 has a data packet, the external queue Q0 corresponding to the IQ0 has a data packet in the same packet stream and the EQ0 corresponding to the IQ0 among the multiple egress queues reaches an afull threshold, it indicates that an on-chip data packet transmission path sequentially consist of the IQ0, the Bypass FIFO and the EQ0 is congested. At this time, since the external queue Q0 in the external DDR2 SDRAM is in a non-full state although it stores a data packet, the ingress control unit reads the data packet in the IQ0, adds an identifier of the IQ0 to the data packet, and stores the data packet into the WRQ connected with memory control unit. At the same time, the ingress control unit stores a write pointer WPTR0 which is in the external memory write pointer list and corresponds to the IQ0 into the WADDR, and adds a product of a difference between adjacent actual addresses sequentially occupied by the Q0 in the external DDR2 SDRAM and the length of the data packet to the WPTR0, so as to update the WPTR0. Afterwards, the memory control unit may write the data packet which is in the WRQ and belongs to the IQ0 into the external queue Q0 in the external DDR2 SDRAM according to the WPTR0 in the WADDR.

Figure 7B:
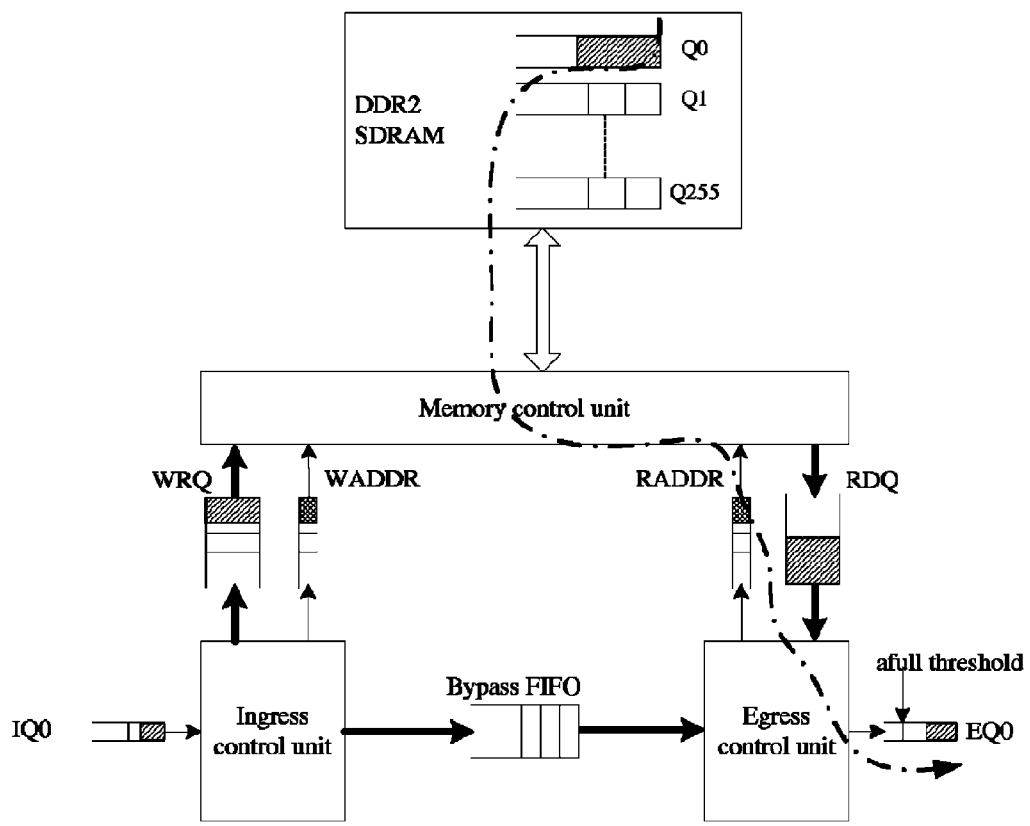

Referring to FIG. 7b, signal transmissions between units are omitted, and a data packet transmission path is shown by a dashdotted line. The Bypass FIFO is empty, the egress control unit performs an RR scheduling operation to the multiple egress queues. When the EQ0 is scheduled, if the EQ0 does not reach an afull threshold and the external queue Q0 in the external DDR2 SDRAM is non-empty, the egress control unit reads a read pointer RPTR0 corresponding to the EQ0 from the external memory read pointer list, and stores the RPTR0 into the RADDR. Afterwards, the memory control unit may read a data packet from the external queue Q0 in the external DDR2 SDRAM according to the RPTR0 in the RADD, and stores the data packet into the read data input queue RDQ. The egress control unit reads the data packet with the identifier of the IQ0 from the RDQ, stores the data packet into the EQ0, and adds a product of a difference between adjacent actual addresses sequentially occupied by the Q0 in the external DDR2 SDRAM and the length of the data packet with the identifier of the IQ0 read from the RDQ to the RPTR0, so as to update the RPTR0.

Based on the instances shown in FIG. 6, FIG. 7a and FIG. 7b, if external data packets enter into the ingress queue slower than the egress queue transmits data packets out, the data packets in the ingress queue may be transmitted through the first-level cache path to which the Bypass FIFO in the apparatus shown in FIG. 6 belongs because the egress queue corresponding to the ingress queue is non-full and the Bypass FIFO is non-full, so as to reduce the delay of the data packet in the data packet access control apparatus. If the data packets enter into the ingress queue faster than the egress queue transmits data packets out, it will results that the egress queue is afull or full. At this time, the data packets in the ingress queue need to be stored into the external DDR2 SDRAM, i.e. the data packets are transmitted through the second-level cache path to which a bus of the external DDR2 SDRAM shown in FIG. 7a and FIG. 7b is located. Preferably, the memory control unit has a higher priority to write in the external DDR2 SDRAM than read.

Hereinbefore, the structure of the data packet access control apparatus including the first-level cache path has been described in detail in the embodiments. In addition, a read/write operating mode of the external DDR2 SDRAM, i.e. the control logic, may be further improved.

Since sizes of different data packets are different, usually 64~1500 bytes, for each data packet in each packet stream, a read operation may be performed to each ingress queue IQi by taking each cell as a unit, a reading/writing operation may be performed to the Bypass FIFO and each external queue Qi in the external DDR2 SDRAM by taking each cell as a unit, and a write operation may be performed to each egress queue EQi by taking each cell as a unit. In this way, for a DDR2 SDRAM having 4 BANKs and one row in each BANK has 64 bytes, a cell may be averagely divided to be stored in the 4 BANKs, and there is no need to perform a switch-row operation through the Precharge command and the ACT command.

In practical applications, each cell may contain multiple data packets, or multiple cells may constitute one data packet. If remained data packets in a certain packet stream are not enough to constitute one cell, the remained data packets may be transmitted through the on-chip Bypass FIFO when the external queue in the DDR2 SDRAM is empty.

In addition, the control logic of the external DDR2 SDRAM may be implemented through a BANK interleave mode.

Specifically, the memory control unit writes a data packet into an external queue in the external DDR2 SDRAM by taking each cell as a unit. Each cell is divided into multiple segments (preferably, the number of the segments is the same as the number of BANKs). The segments of the same cell are written into different BANKs. Each segment of the same cell only occupies a little part of one row in one BANK, i.e. one segment of the cell is located in the same row in one BANK. The memory control unit sequentially transmits ACT commands and WR commands containing Auto Precharge commands to the external DDR2 SDRAM at a predetermined interval with respect to the rows of the BANKs in which the segments of each cell are located, so as to eliminate a bus waiting time before each segment is written into the external DDR2 SDRAM.

Similarly, the memory control unit reads a data packet from an external queue in the external DDR2 SDRAM by taking each cell as a unit, and sequentially transmits ACT commands and RD commands containing Auto Precharge commands to the external DDR2 SDRAM at a predetermined interval with respect to the rows of the BANKs in which the segments of each cell are located, so as to eliminate a bus waiting time before each segment is read from the external DDR2 SDRAM.

Further, in order to eliminate the bus waiting time before each segment is written into the external DDR2 SDRAM, the size of one cell should be smaller than or equal to a product of the number of the BANKs and the number of columns, i.e. the size of one cell should not exceed a product of the capacity of one row and the number of the BANKs. In addition, since one cell is divided into multiple segments and stored in different BANKs, in order to avoid that reading/writing time of other BANKs is not enough for the Precharge time of the first BANK after the first BANK is read or written, i.e. not enough for the first BANK to complete Precharge, the size of one cell should not be smaller than a maximum data amount that can be read or written within the reading/writing time of one BANK and the Precharge time, i.e. the reading/writing time of other BANKs is enough for the first BANK to complete Precharge after the first BANK is read or written.

According to the above reading/writing mode, each external queue in the external DDR2 SDRAM stores segments of a cell. For example, a cell is divided into 4 segments which are respectively written into 4 BANKs. Each BANK has an address space of 100, i.e. BANK 0 has an address space from Addr 0 to Addr 99, BANK 1 has an address space from Addr 100 to Addr 199, . . . , BANK 3 has an address space from Addr 300 to Addr 399. Suppose the addresses of the 4 segments in the 4 BANKs are respectively 31, 131, 231 and 331, the write pointers put in the WADDR when writing the segments into the external SDRAM should be 31, 131, 231 and 331. It is apparent that these addressed are discontinuous and a difference between each two adjacent addresses equals to the capacity of one BANK.

Moreover, when the write pointer WPTRi and the read pointer RPTRi are updated, for data in one segment of the same cell, the number of columns occupied by the data in the segment is added to the write pointer WPTRi and the read pointer RPTRi. When data in a next segment of the same cell are written or read, it is needed to add 1 to a second lower bit of the write pointer WPTRi or the read pointer RPTRi which indicates the BANK address, and then the number of columns occupied by the data is added to the write pointer WPTRi or the read pointer RPTRi. The configuration and updating of the write pointer WPTRi and the read pointer RPTRi can be implemented by those skilled in the art through any manner and will not be described in detail hereinafter.

Figure 8:
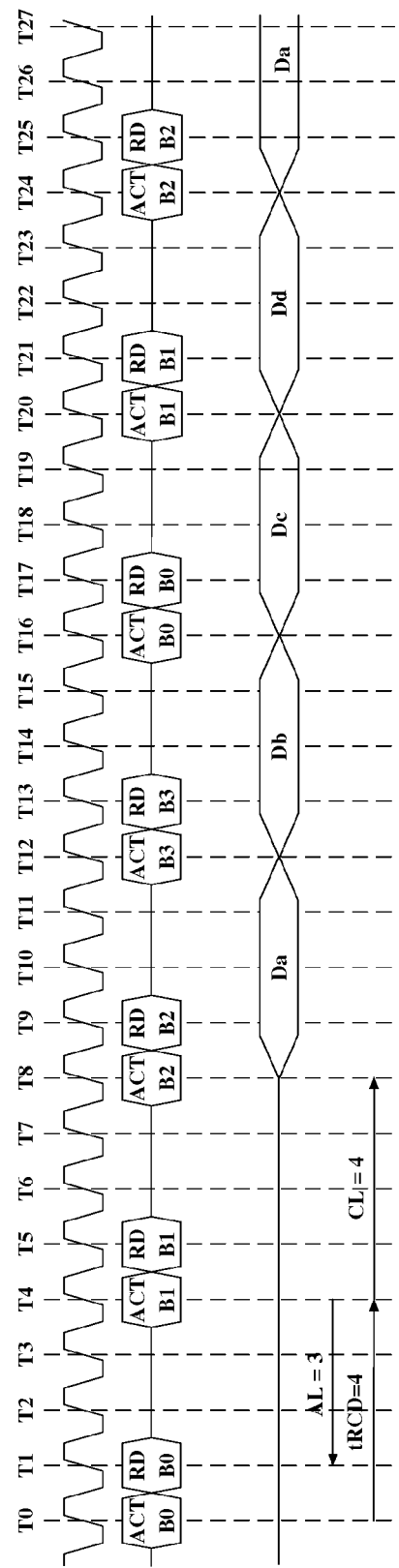
FIG. 8 is a time sequence diagram of a reading operation to an external RAM according to an embodiment of the present invention.

Referring to FIG. 8, a continuous reading of two cells is taken as an example, wherein each cell occupies 256 bytes and 16 clock cycles. Suppose that each cell is averagely divided into 4 segments Da, Db, Dc and Dd, the 4 segments are respectively written into one row of BANK0, BANK1, BANK2 and BANK3 (Da of the two cells are written into different rows of BANK0, it is similar for Db, Dc and Dd of the two cells), and it is started from the time when the memory control unit reads from the read pointer output queue RADDR a read pointer corresponding to an ingress queue to which a data packet where the cell is located belongs.

At clock cycle T0, the memory control unit transmits an ACT command to the external DDR2 SDRAM with respect to a row in BANK0 where Da of the first cell is located, and the row in BANK0 of the external DDR2 SDRAM where Da of the first cell is located is activated.

At clock cycle T1, the memory control unit transmits an RD command containing an Auto Precharge command to the external DDR2 SDRAM with respect to the row in BANK0 where Da of the first cell is located. It should be noted that, although a parameter tRCD in the external DDR2 SDRAM is configured as 4, i.e. after the ACT command is issued, a read operation cannot be performed until waiting for 4 clock cycles, in order to make the ACT commands and the RD commands containing the Auto Precharge commands with respect to the 4 segments of each cell more closer, an existing parameter AL in the external DDR2 SDRAM may be configured as 3, so that the RD command containing the Auto Precharge command can be transmitted 3 clock cycles earlier, and thus each time the ACT command is transmitted, the RD command containing the Auto Precharge command can be transmitted at the next clock cycle. It is similar for the subsequently transmitted RD commands containing the Auto Precharge commands.

Clock cycles T2~T3 are idle. It should be noted that, although the RD command containing the Auto Precharge command is transmitted 3 clock cycles earlier, the external DDR2 SDRAM cannot start a read operation to the activated row until clock cycle T4 because the parameter tRCD is configured as 4.

At clock cycle T4, the memory control unit transmits an ACT command to the external DDR2 SDRAM with respect to a row in BANK1 where Db of the first cell is located, and the row in BANK1 of the external DDR2 SDRAM where Db of the first cell is located is activated. At the same time, the external DDR2 SDRAM starts the read operation to the row in BANK0 where Da of the first cell is located.

At clock cycle T5, the memory control unit transmits an RD command containing an Auto Precharge command to the external DDR2 SDRAM with respect to the row in BANK1 where Db of the first cell is located. At the same time, the external DDR2 SDRAM keeps on the read operation to the row in BANK0 where Da of the first cell is located.

At clock cycles T6~T7, the external DDR2 SDRAM keeps on the read operation to the row in BANK0 where Da of the first cell is located. As to the RD command containing the Auto Precharge command with respect to the row in BANK1 where Db of the first cell is located, the external DDR2 SDRAM is in a wait state.

At clock cycle T8, the memory control unit transmits an ACT command to the external DDR2 SDRAM with respect to a row in BANK2 where Dc of the first cell is located, and the row in BANK2 of the external DDR2 SDRAM where Dc of the first cell is located is activated. The external DDR2 SDRAM starts to output Da of the first cell in BANK 0 to the memory control unit through a bus, closes the row in BANK0 where Da of the first cell is located through an Auto Precharge operation, and starts a read operation with respect to the row in BANK1 where Db of the first cell is located.

At clock cycle T9, the memory control unit transmits an RD command containing an Auto Precharge command to the external DDR2 SDRAM with respect to the row in BANK2 where Dc of the first cell is located. At the same time, the external DDR2 SDRAM keeps on outputting Da of the first cell in BANK0 to the memory control unit through the bus, and keeps on the read operation to the row in BANK1 where Db of the first cell is located.

At clock cycles T10~T11, the external DDR2 SDRAM keeps on outputting Da of the first cell in BANK0 to the memory control unit through the bus and keeps on the read operation to the row in BANK1 where Db of the first cell is located. As to the RD command containing the Auto Precharge command with respect to the row in BANK2 where Dc of the first cell is located, the external DDR2 SDRAM is in a wait state.

At clock cycle T12, the memory control unit transmits an ACT command to the external DDR2 SDRAM with respect to a row in BANK3 where Dd of the first cell is located, and the row in BANK3 of the external DDR2 SDRAM where Dd of the first cell is located is activated. At this time, the output of Da of the first cell in BANK0 completes. The external DDR2 SDRAM starts to output Db of the first cell in BANK1 to the memory control unit through the bus, closes the row in BANK1 where Db of the first cell is located through an Auto Precharge operation, and starts a read operation to the row in BANK2 where Dc of the first cell is located.

At clock cycle T13, the memory control unit transmits an RD command containing an Auto Precharge command to the external DDR2 SDRAM with respect to the row in BANK3 where Dd of the first cell is located. At the same time, the external DDR2 SDRAM keeps on outputting Db of the first cell in BANK1 to the memory control unit through the bus, and keeps on the read operation to the row in BANK2 where Dc of the first cell is located.

At clock cycles T14~T15, the external DDR2 SDRAM keeps on outputting Db of the first cell in BANK1 to the memory control unit through the bus, and keeps on the read operation to the row in BANK2 where Dc of the first cell is located. As to the RD command containing the Auto Precharge command with respect to the row in BANK3 where Dd of the first cell is located, the external DDR2 SDRAM is in a wait state.

At clock cycle T16, the memory control unit transmits an ACT command to the external DDR2 SDRAM with respect to a row in BANK0 where Da of the second cell is located, and the row in BANK0 of the external DDR2 SDRAM where Da of the second cell is located is activated (this row is different from the row where Da of the first cell is located activated at clock cycle T0). At this time, the output of Db of the first cell in BANK1 completes, and the row in BANK1 where Db of the first cell is located is closed through an Auto Precharge operation. The external DDR2 SDRAM starts to output Dc of the first cell in BANK2 to the memory control unit through the bus, and starts a read operation with respect to the row in BANK3 where Dd of the first cell is located.

At clock cycle T17, the memory control unit transmits an RD command containing an Auto Precharge command to the external DDR2 SDRAM with respect to the row in BANK0 where Da of the second cell is located. At the same time, the external DDR2 SDRAM keeps on outputting Dc of the first cell in BANK2 to the memory control unit through the bus, and keeps on the read operation to the row in BANK3 where Dd of the first cell is located.

At clock cycles T18~T19, the external DDR2 SDRAM keeps on outputting Dc of the first cell in BANK2 to the memory control unit through the bus and keeps on the read operation to the row in BANK3 where Dd of the first cell is located. As to the RD command containing the Auto Precharge command with respect to the row in BANK0 where Da of the second cell is located, the external DDR2 SDRAM is in a wait state.

At clock cycle T20, the memory control unit transmits an ACT command to the external DDR2 SDRAM with respect to a row in BANK1 where Db of the second cell is located, and the row in BANK1 of the external DDR2 SDRAM where Db of the second cell is located is activated (this row is different from the row where Db of the first cell is located activated at clock cycle T4). At this time, the output of Dc of the first cell in BANK2 completes, and the row in BANK2 where Dc of the first cell is located is closed through an Auto Precharge operation. The external DDR2 SDRAM starts to output Dd of the first cell in BANK3 to the memory control unit through the bus and starts a read operation to the row in BANK0 where Da of the second cell is located.

At clock cycle T21, the memory control unit transmits an RD command containing an Auto Precharge command to the external DDR2 SDRAM with respect to the row in BANK1 where Db of the second cell is located. At the same time, the external DDR2 SDRAM keeps on outputting Dd of the first cell in BANK3 to the memory control unit through the bus, and keeps on the read operation to the row in BANK0 where Da of the second cell is located.

At clock cycles T22~T23, the external DDR2 SDRAM keeps on outputting Dd of the first cell in BANK3 to the memory control unit through the bus and keeps on the read operation to the row in BANK0 where Da of the second cell is located. As to the RD command containing the Auto Precharge command with respect to the row in BANK1 where Db of the second cell is located, the external DDR2 SDRAM is in a wait state.

At clock cycle T24, the memory control unit transmits an ACT command to the external DDR2 SDRAM with respect to a row in BANK2 where Dc of the second cell is located, and the row in BANK2 of the external DDR2 SDRAM where Dc of the second cell is located is activated (this row is different from the row where Dc of the first cell is located activated at clock cycle T8). At this time, the output of Dd of the first cell in BANK3 completes, and the row in BANK3 where Dd of the first cell is located is closed through an Auto Precharge operation. The external DDR2 SDRAM starts to output Da of the second cell in BANK0 to the memory control unit through the bus, and starts a read operation to the row in BANK1 where Db of the second cell is located.

At clock cycle T25, the memory control unit transmits an RD command containing an Auto Precharge command to the external DDR2 SDRAM with respect to the row in BANK2 where Dc of the second cell is located. At the same time, the external DDR2 SDRAM keeps on outputting Da of the second cell in BANK0 to the memory control unit through the bus, and keeps on the read operation to the row in BANK1 where Db of the second cell is located.

At clock cycles T26~T27, the external DDR2 SDRAM keeps on outputting Da of the second cell in BANK0 to the memory control unit through the bus and keeps on the read operation to the row in BANK1 where Db of the second cell is located. As to the RD command containing an Auto Precharge command with respect to the row in BANK2 where Dc of the second cell is located, the external DDR2 SDRAM is in a wait state.

Afterwards, all segments of the second cell will be outputted if the procedure keeps on being performed following the principle of T12~T19.

As can be seen from the above instances, as long as it is guaranteed that the length of the above predetermined interval, i.e. the length of an interval of the memory control unit sequentially transmitting the ACT commands to the external DDR2 SDRAM with respect to the rows of the BANKs where the segments of each cell are located, and the length of an interval of transmitting the RD commands containing the Auto Precharge commands, are less than or equal to the length of clock cycles for transmitting one row of data by the bus of the external DDR2 SDRAM, the bus waiting time for reading segments of the same cell or different cells from the external DDR2 SDRAM can be eliminated. It is similar for the procedure of continuous writing of cells.

Moreover, in the above embodiment, two cells may be continuously read within 40 clock cycles. During the 40 clock cycles, the bus of the external DDR2 SDRAM is idle only at 8 clock cycles from T0 to T7. The bus usage ratio reaches 80%, which improves the data packet storage and forwarding efficiency. Furthermore, even if the number of continuously read cells increases, the bus of the external DDR2 SDRAM will still be idle only at 8 clock cycles. Thus the bus usage ratio may be further improved along with the increase of the number of the continuously read cells. Thus, the data packet storage and forwarding efficiency is further improved.

However, in practical applications, since data packets need to be forwarded after being stored, the external DDR2 SDRAM can be seen as a FIFO with a writing/reading proportion of 1:1. Thus, there also has a reading/writing switch besides continuous reading and continuous writing operations. For a read-to-write switch, the memory control unit waits for the above predetermined interval or any number of clock cycles after sequentially transmitting an ACT command and an RD command containing an Auto Precharge command to the external DDR2 SDRAM, and then transmits an ACT command (it is not needed to transmit the ACT command if the write operation is performed to a same row corresponding to the former RD command) and a WR command containing an Auto Precharge command.

Usually, the features of the DDR2 SDRAM may result in a predetermined number of idle clock cycles when switch from read to write or from write to read.

Figure 9A:
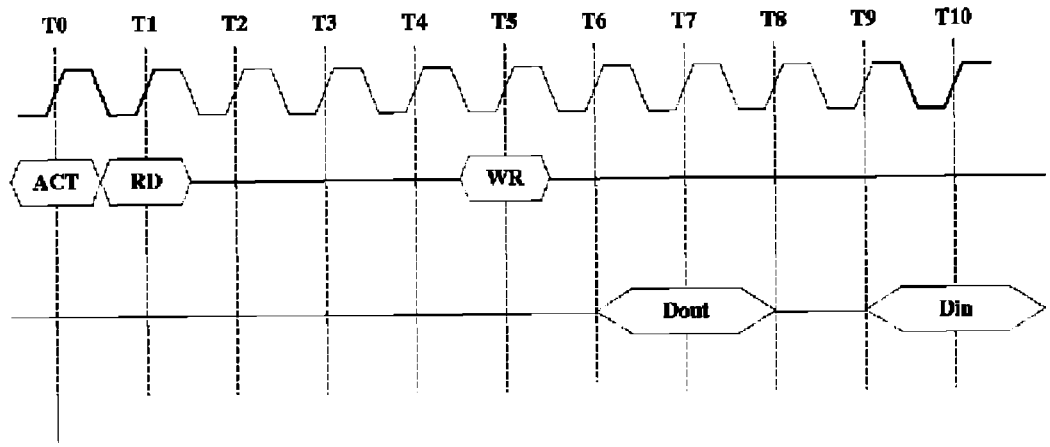
FIG. 9a~FIG. 9b are time sequence diagrams of a switch between a read operation and a write operation to an external RAM according to an embodiment of the present invention.

Referring to FIG. 9a, data Dout are firstly read out from a row in a BANK, and then data Din are written into the same row in the same BANK. Even if the WR command is transmitted earlier according to a predetermined interval after the RD command, the external DDR2 SDRAM still needs to wait for one clock cycle T8 after the bus of the external DDR2 SDRAM outputs Dout before starting to receive the written data Din through the bus. The situation is the similar when data Dout are firstly read out from a row in a BANK and then data Din are written into different rows in the same BANK or different BANKs.

Figure 9B:
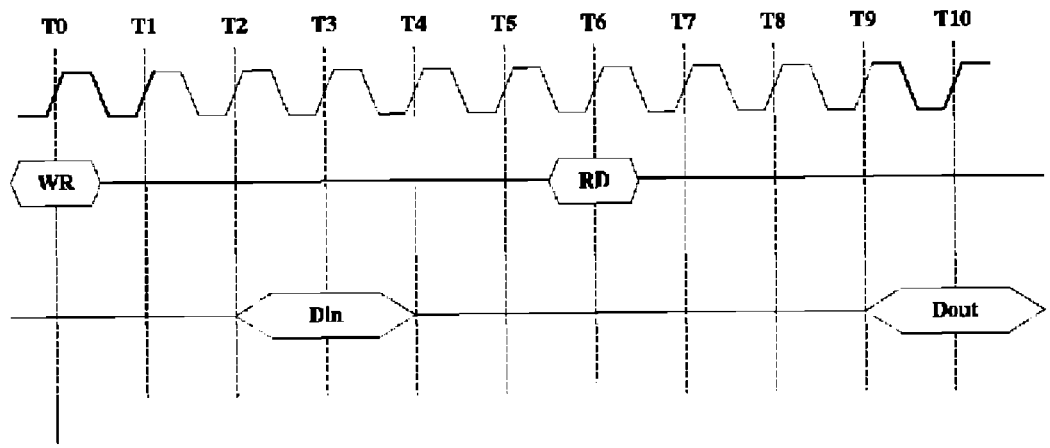

Referring to FIG. 9b, data Din are firstly written into a row in a BANK, and then data Dout are read out from the same row in the same BANK. No matter whether the RD command is transmitted earlier, the external DDR2 SDRAM must wait for 5 clock cycles from T4 to T8 after the bus of the external DDR2 SDRAM inputs Din before starting to output Dout through the bus.

In the above FIG. 9a and FIG. 9b, only one type of DDR2 SDRAM is taken as an example. In practical applications, the number of idle clock cycles between read and write operations or between write and read operations may be different for different types of DDR2 SDRAMs.

However, although there exist idle clock cycles between read and write operations and between write and read operations, compared with the conventional scheme, the scheme of the embodiment still improves the bus usage ratio of the external DDR2 SDRAM.

For a worst case in which a cell is read and written alternatively, the bus usage ratio may be as follows:

$$BUS_{Efficiency} = \frac{Write\_CLK + Read\_CLK}{Write\_CLK + Write\_to\_Read\_CLK + Read\_CLK + Read\_to\_Write\_CLK}$$

wherein $BUS_{Efficiency}$ denotes the bus usage ratio, Write_CLK denotes the number of clock cycles for writing in the cell, Write_to_Read_CLK denotes the number of idle clock cycles occupied by the write-to-read switch, Read_CLK denotes the number of clock cycles for reading the cell, and Write_to_Read_CLK denotes the number of idle clock cycles occupied by the read-to-write switch.

If Write_CLK and Read_CLK are 16, Write_to_Read_CLK is 1 and Read to Write_CLK is 5, $$BUS_{Efficiency} = \frac{16 + 16}{16 + 5 + 16 + 1} = 84.21\%.$$

If the bus rate of the external DDR2 SDRAM is 266 MHz, an effective bandwidth of the bus will be 266×64×2×84.21%=28.67 Gbps, which is enough to meet a 10 Gbit capacity requirement for reading and writing data packets (including 10 Gbit for reading data and 10 Gbit for writing data).

Certainly, the above formula does not consider the waiting time of the first reading or writing operation shown by clock cycles T0~T7 in FIG. 8. But for continuous reading and writing of large amount of cells, the waiting time may appear only once, and thus can be omitted.

The foregoing is a detail description of the data packet access control apparatus in the embodiments. Hereinafter, a data packet access control method will be described in detail with reference to embodiments.

The data packet access control method in the embodiments may be based on the same principle of the data packet access control apparatus. It may be implemented by a computer hardware program or computer software and hardware programs and applied in an ASIC chip or an FPGA chip.

The data packet access control method in the embodiments may write data packets received by the ASIC chip or the FPGA chip into an external RAM, read data packets from the external RAM to the ASIC chip or the FPGA chip and transmit the data packets out from the ASIC chip or the FPGA chip.

Specifically, in the data packet access control method in the embodiments, multiple ingress queues and multiple corresponding egress queues need to be configured in the ASIC chip or the FPGA chip, and a Bypass FIFO for transmitting data packets within the chip needs to be configured in the ASIC chip or the FPGA chip.

The data packet access control method includes the following steps, wherein a DDR2 SDRAM is taken as an exemplary external RAM.

In order to store data packets received from external in the ASIC chip or the FPGA chip, if an ingress queue is non-empty, determine whether a corresponding external queue in the external DDR2 SDRAM stores a data packet.

If the corresponding external queue in the external DDR2 SDRAM stores a data packet and is non-full, it indicates that a packet stream corresponding to the ingress queue has a data packet stored in the external queue, and the external queue can keep on storing data packets. Therefore, in order to guarantee that sequences of data packets in the packet stream corresponding to the ingress queue will not change, data packets in the ingress queue are provided to a memory control unit, so that the data packets are transmitted through an off-chip second-level cache path in which a data bus of the external DDR2 SDRAM is located.

If the corresponding external queue in the external DDR2 SDRAM stores no data packet, determine whether the Bypass FIFO and an egress queue corresponding to the ingress queue are both non-full.

If the corresponding external queue in the external DDR2 SDRAM is empty, and the Bypass FIFO and the egress queue are both non-full, it indicates that the packet stream corresponding to the ingress queue has no data packet stored in the external queue, and the data packets can be transmitted to the egress queue through the Bypass FIFO. Therefore, the data packets in the ingress queue are written into the Bypass FIFO, so that the data packets in the ingress queue are transmitted through an on-chip first-level cache path where the Bypass FIFO is located.

If the corresponding external queue in the external DDR2 SDRAM is empty, and the egress queue corresponding to the ingress queue is afull or full, since the corresponding external queue in the external DDR2 SDRAM is empty, the data packets in the ingress queue are provided to the memory control unit, so that the data packets in the ingress queue can be transmitted through the off-chip second-level cache path where the bus of the external DDR2 SDRAM is located.

Otherwise, if the corresponding external queue in the external DDR2 SDRAM has data packets but is full, a reading/writing operation will not be performed for the ingress queue for the moment.

In order to forward the stored data packets, if the Bypass FIFO is non-empty, data packets are read from the Bypass FIFO and stored in a corresponding egress queue. If the Bypass FIFO is empty, an egress queue is non-full and the external queue in the external DDR2 SDRAM is non-empty, data packets are read from the external queue in the external DDR2 SDRAM and are stored in the egress queue. Otherwise, if the Bypass FIFO is empty, and the external queue has no data packet, the reading/writing operation will not be performed for the egress queue for the moment.

Figure 10A:
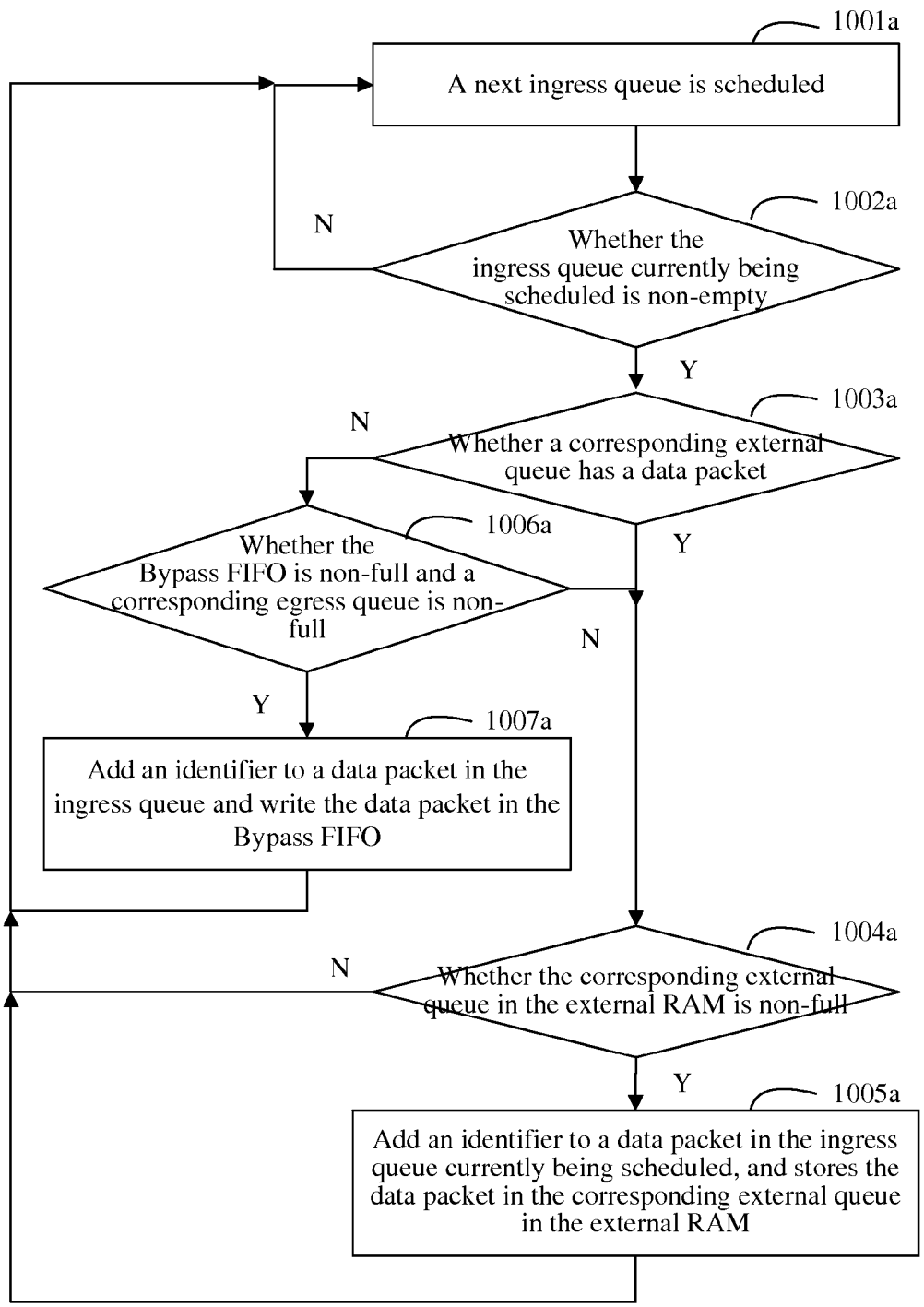
FIG. 10a~FIG. 10b are flowcharts of a data packet access control method according to an embodiment of the present invention.

Referring to FIG. 10a, in order to store data packets received from external in the ASIC chip or the FPGA chip, a specific procedure may include the following steps.

Step 1001a: a next ingress queue is scheduled during RR scheduling.

Step 1002a: according to a status signal generated by the ingress queue currently being scheduled indicating the status of the ingress queue, determine whether the ingress queue is non-empty; if the ingress queue is non-full, proceed to step 1003a; otherwise, return to step 1001a to continue the RR scheduling.

Step 1003a: determine whether a corresponding external queue in the external DDR2 SDRAM has a data packet; if the external queue has a data packet, proceed to step 1004a; otherwise, proceed to step 1006a.

In the embodiment, an external memory write pointer list and an external memory read pointer list may be further configured. In the step, it is possible to determine whether the corresponding external queue in the external DDR2 SDRAM is non-full according to the external memory write pointer list and the external memory read pointer list following a conventional method.

Step 1004a: determine whether the corresponding external queue in the external DDR2 SDRAM is non-full; if the external queue is non-full, proceed to step 1005a; otherwise, return to step 1001a to continue the RR scheduling.

In this step, it is possible to determine whether the corresponding external queue in the external DDR2 SDRAM is non-full according to the external memory write pointer list and the external memory read pointer list.

Step 1005a: add an identifier to a data packet in the ingress queue currently being scheduled, store the data packet in the corresponding external queue in the external DDR2 SDRAM, and return to step 1001a to continue the RR scheduling.

In this step, the data packet in the non-full ingress queue currently being scheduled to be stored in the corresponding external queue in the external DDR2 SDRAM may be firstly stored in a write data output queue preconfigured in the ASIC chip or the FPGA chip. At the same time, a current write pointer in an external memory write pointer list corresponding to the ingress queue may be stored in a write address output queue preconfigured in the ASIC chip or the FPGA chip. The write pointer is updated. And then, according to the write pointer in the write address output queue, the data packet stored in the write data output queue may be written into corresponding external queues in the external DDR2 SDRAM.

Step 1006a, determine whether the Bypass FIFO is non-full and the egress queue corresponding to the ingress queue is non-full; if yes, proceed to step 1007a; otherwise, proceed to step 1004a.

Step 1007a: if the Bypass FIFO is non-full and can store data packets, the egress queue corresponding to the ingress queue is non-full and a situation that a data packet will be lost due to unable to be stored in the egress queue corresponding to the ingress queue will not emerge, the data packet in the ingress queue is written into the Bypass FIFO after an identifier is added to the data packet, and return to step 1001a.

Now, the above procedure ends.

Figure 10B:
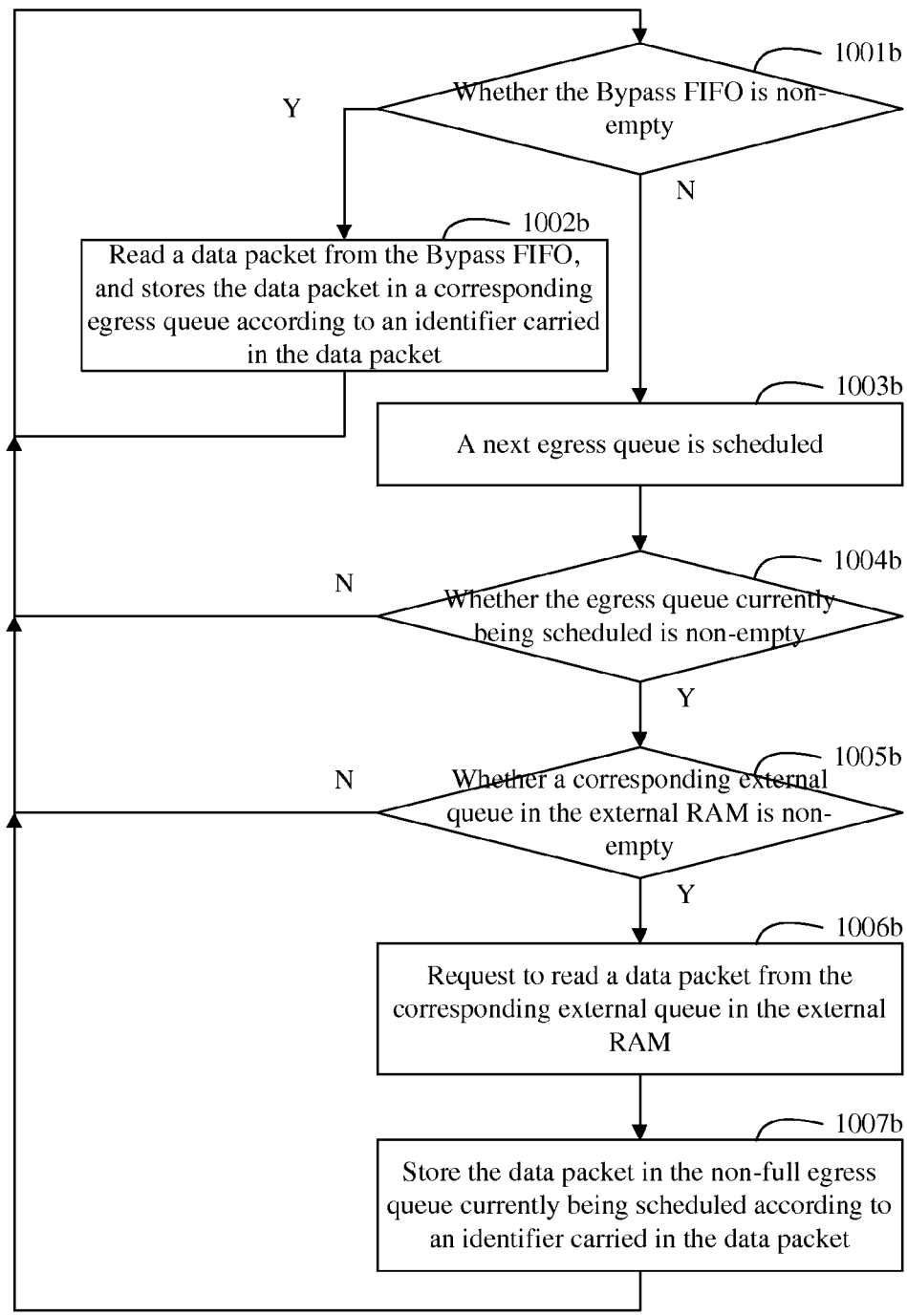

Referring to FIG. 10b, in order to forward the stored data packets, a specific procedure may include the following steps.

Step 1001b: determine whether the Bypass FIFO is non-empty; if the Bypass FIFO is non-empty, proceed to step 1002b; otherwise, proceed to step 1003b.

Step 1002b: read a data packet from the Bypass FIFO, and store the data packet in an egress queue according to an identifier carried by the data packet, and then return to step 1001b.

Step 1003b: a next egress queue is scheduled by RR scheduling.

Step 1004b: according to a status signal generated by the egress queue currently being scheduled indicating the status of the egress queue, determine whether the egress queue is non-full; if the egress queue is non-full, proceed to step 1005b; otherwise, return to step 1001b.

Step 1005b: determine whether a corresponding external queue in the external RAM is non-empty; if the external queue in the external RAM is non-empty, proceed to step 1006b; otherwise, return to step 1001b.

In the embodiment, an external memory write pointer list and an external memory read pointer list may be further configured. In the step, it is possible to determine whether the external queue in the external RAM is non-full according to the external memory write pointer list and the external memory read pointer list following a conventional method.

Step 1006b: request to read a data packet from the external queue in the external RAM.

In this step, a read pointer in the external memory read pointer list preconfigured in the ASIC chip or the FPGA chip corresponding to an egress queue in a non-full state may be stored in a read address output queue preconfigured in the ASIC chip or the FPGA chip in advance, then a data packet is read from the read data input queue, and the read pointer is updated.

Step 1007b: store the data packet in the non-full egress queue currently being scheduled according to the identifier carried in the read data packet, and then return to step 1001b.

Now, the above procedure ends.

As can be seen from the above procedures shown in FIG. 10a and FIG. 10b, in the data packet access control method of the embodiments, a Bypass FIFO is used as a first-level cache for small amount of data, and an external RAM is used as a second-level cache for large amount of data. In this way, some data packets are read and written within the chip and not all data packets are read and written through the external RAM, so that the effect of low bus usage ratio of the external RAM on the data packet transmission efficiency is reduced, and the data packet transmission efficiency is improved.

In addition, in step 1006a in the procedure shown in FIG. 10a, a data packet is preferably written into the external queue in the external RAM by taking each cell as a unit. Segments of the same cell are written into different BANKs. Each segment is located in a same row of one BANK, and the memory control unit sequentially transmits ACT commands and write commands containing Precharge commands at a predetermined interval to rows of the BANKs where the segments of each cell are located, so as to eliminate the bus waiting time before each segment is written into the external RAM.

In step 1006b in the procedure shown in FIG. 10b, a data packet is preferably read from the external queue in the external RAM by taking each cell as a unit, and the memory control unit sequentially transmits ACT commands and read commands containing Precharge commands at a predetermined interval to rows of the BANKs where the segments of each cell are located, so as to eliminate the bus waiting time before each segment is read from the external RAM.

In this way, the bus waiting time before each segment is read from the external RAM can be eliminated, and thus the bus usage ratio of the external RAM and the data packet transmission efficiency are improved.

The foregoing are only preferred embodiments of the present invention and are not for use in limiting the protection scope of the present invention. Any modification, equivalent replacement and improvement made within the spirit and principle of the present invention should be covered under the protection scope of the present invention.

What is claimed is:

1. A data packet access control apparatus, communicatively connected with an external Random Access Memory (RAM) having a plurality of external queues, the apparatus comprising:

an ingress queue unit, configured with a plurality of ingress queues;

an egress queue unit, configured with a plurality of egress queues; wherein each ingress queue is uniquely corresponding to an the egress queue, and each pair of ingress queue and egress queue is uniquely corresponding to an external queue in the external RAM;

a memory control unit, adapted to respectively store data packets of the ingress queues into their corresponding external queues in the external RAM, and to respectively read data packets to be stored in the egress queues from the corresponding external queues in the external RAM;

a Bypass FIFO, adapted to cache the data packets of the ingress queues and transmit the data packets to the corresponding egress queues;

an ingress control unit, adapted to provide a data packet in an ingress queue to the memory control unit if the ingress queue is non-empty and a corresponding external queue has a data packet and is non-full; to write the data packet in the ingress queue into the Bypass FIFO if a corresponding external queue is empty and the Bypass FIFO and a corresponding egress queue are both non-full; to provide the data packet in the ingress queue to the memory control unit if the corresponding external queue is empty and the Bypass FIFO or the corresponding egress queue is afull or full; and to perform no reading/writing operation for the ingress queue if the external queue is full; and an egress control unit, adapted to read a data packet from the Bypass FIFO and store the data packet into an egress queue if the Bypass FIFO is non-empty; to request the memory control unit to read a data packet from a corresponding external queue and store the data packet into the egress queue if the Bypass FIFO is empty and the egress queue is non-full and the corresponding external queue is non-empty; and to perform no reading/writing operation for the egress queue if the Bypass FIFO is empty and the corresponding external queue has no data packet.

2. The data packet access control apparatus of claim 1, wherein the ingress queue unit further comprises an ingress selector, the ingress selector comprises multiple inputs and one output, each input of the ingress selector is connected with an ingress queue, and the output of the ingress selector is connected with the ingress control unit;

the ingress control unit is further adapted to output an ingress round robin control signal to a control end of the ingress selector, to control to connect each input of the ingress selector with the output of the ingress selector in turn through a round robin manner;

the egress queue unit further comprises an egress selector, the egress selector comprises one input and multiple outputs, each output of the egress selector is connected with an egress queue, and the input of the egress selector is connected with the egress control unit; and the egress control unit is further adapted to output an egress round robin control signal to a control end of the egress selector, to control to connect each output of the egress selector with the input of the egress selector in turn through a round robin manner.

3. The data packet access control apparatus of claim 1, wherein each ingress queue is further adapted to output a status signal indicating a status of the ingress queue to the ingress control unit for determining whether the ingress queue is non-empty; and each egress queue is further adapted to output a status signal indicating a status of the egress queue to the egress control unit and the ingress control unit for determining whether the egress queue is non-full.

4. The data packet access control apparatus of claim 1, wherein the ingress control unit is further adapted to maintain an external memory write pointer list, and is further connected with the memory control unit through a write data output queue and a write address output queue; the ingress control unit is further adapted to store a data packet of an ingress queue into the write data output queue, to store a current write pointer in the external memory write pointer list corresponding to the ingress queue into the write address output queue, and to update the write pointer;

the egress control unit is further adapted to maintain an external memory read pointer list, and is further connected with the memory control unit through a read data input queue and a read address output queue; the egress control unit is further adapted to store a read pointer in the external memory read pointer list corresponding to an non-full egress queue into the read address output queue, to read a data packet from the read data input queue, and to update the read pointer; and the ingress control unit and the egress control unit are further adapted to determine a status of each external queue in the external RAM according to the external memory write pointer list and the external memory read pointer list.

5. The data packet access control apparatus of claim 1, wherein the memory control unit is further adapted to write a data packet into an external queue in the external RAM by taking a cell as a unit, wherein segments of a same cell are written into different BANKs and each segment is in a same row, and the memory control unit is further adapted to sequentially transmit active commands and write commands containing Precharge commands at a predetermined interval to the rows of the BANKs where the segments of the cell are located; and the memory control unit is further adapted to read a data packet from an external queue in the external RAM by taking a cell as a unit, and sequentially transmit active commands and read commands containing Precharge commands at a predetermined interval to the rows of the BANKs where the segments of the cell are located.

6. The data packet access control apparatus of claim 2, wherein the memory control unit is further adapted to write a data packet into an external queue in the external RAM by taking a cell as a unit, wherein segments of a same cell are written into different BANKs and each segment is in a same row, and the memory control unit is further adapted to sequentially transmit active commands and write commands containing Precharge commands at a predetermined interval to the rows of the BANKs where the segments of the cell are located; and the memory control unit is further adapted to read a data packet from an external queue in the external RAM by taking a cell as a unit, and sequentially transmit active commands and read commands containing Precharge commands at a predetermined interval to the rows of the BANKs where the segments of the cell are located.

7. The data packet access control apparatus of claim 3, wherein the memory control unit is further adapted to write a data packet into an external queue in the external RAM by taking a cell as a unit, wherein segments of a same cell are written into different BANKs and each segment is in a same row, and the memory control unit is further adapted to sequentially transmit active commands and write commands containing Precharge commands at a predetermined interval to the rows of the BANKs where the segments of the cell are located; and the memory control unit is further adapted to read a data packet from an external queue in the external RAM by taking a cell as a unit, and sequentially transmit active commands and read commands containing Precharge commands at a predetermined interval to the rows of the BANKs where the segments of the cell are located.

8. The data packet access control apparatus of claim 4, wherein the memory control unit is further adapted to write a data packet into an external queue in the external RAM by taking a cell as a unit, wherein segments of a same cell are written into different BANKs and each segment is in a same row, and the memory control unit is further adapted to sequentially transmit active commands and write commands containing Precharge commands at a predetermined interval to the rows of the BANKs where the segments of the cell are located; and the memory control unit is further adapted to read a data packet from an external queue in the external RAM by taking a cell as a unit, and sequentially transmit active commands and read commands containing Precharge commands at a predetermined interval to the rows of the BANKs where the segments of the cell are located.

9. The data packet access control apparatus of claim 5, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

10. The data packet access control apparatus of claim 6, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

11. The data packet access control apparatus of claim 7, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

12. The data packet access control apparatus of claim 8, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

13. A data packet access control method, applicable for writing data packets received by a chip into an external Random Access Memory (RAM), and for reading data packets from the external RAM to the chip and transmitting the data packets out, wherein a plurality of ingress queues, a plurality of egress queues and a Bypass FIFO is configured in the chip, the external RAM is configured with a plurality of external queues, each ingress queue is uniquely corresponding to an the egress queue, and each pair of ingress queue and egress queue is uniquely corresponding to an external queue in the external RAM, the method comprises:

if an ingress queue is non-empty,
   if a corresponding external queue has a data packet and is non-full, providing, by an ingress control unit, a data packet in the ingress queue to a memory control unit;
   if an external queue corresponding to the ingress queue is empty, and the Bypass FIFO and a corresponding egress queue are both non-full, writing the data packet in the ingress queue into the Bypass FIFO;
   if the external queue corresponding to the ingress queue is empty, and the Bypass FIFO or the corresponding egress queue is afull or full, providing the data packet in the ingress queue to the memory control unit; and
   if the external queue is full, performing no reading/writing operation for the ingress queue;
if the Bypass FIFO is non-empty, reading, by an egress control unit, a data packet from the Bypass FIFO and storing the data packet into the egress queue;
if the Bypass FIFO is empty, an egress queue is non-full and an external queue corresponding to the egress queue is non-empty, reading a data packet from the external queue and store the data packet into the egress queue; and
if the Bypass FIFO is empty and the corresponding external queue has no data packet, performing no reading/writing operation for the egress queue.

14. The data packet access control method of claim 13, further comprising: scheduling the ingress queues or the egress queues in a Round Robin manner.

15. The data packet access control method of claim 13, further comprising:

generating, by each ingress queue, a status signal indicating a status of the ingress for determining whether the ingress queue is non-empty; and generating, by each egress queue, a status signal indicating a status of the egress for determining whether the egress queue is non-full.

16. The data packet access control method of claim 13, further comprising:

configuring an external memory write pointer list and an external memory read pointer list;

storing a data packet of an ingress queue to be stored into an external queue in the external RAM into a write data output queue preconfigured in the chip, storing a current write pointer which is in the external memory write pointer list and corresponds to the ingress queue into the write address output queue preconfigured in the chip, and updating the write pointer;

storing a read pointer which is in the external memory read pointer list and corresponds to a non-full egress queue into a read address output queue preconfigured in the chip, reading a data packet from a read data input queue, and updating the read pointer; and determining a status of each external queue in the external RAM according to the external memory write pointer list and the external memory read pointer list.

17. The data packet access control method of claim 13, further comprising:

writing a data packet into an external queue in the external RAM by taking a cell as a unit, wherein segments of a same cell are written into different BANKs, each segment is in a same row; sequentially transmitting, by the memory control unit, active commands and write commands containing Precharge commands at a predetermined interval to the rows of the BANKs where the segments of the cell are located; and reading a data packet from an external queue in the external RAM by taking a cell as a unit, sequentially transmitting activate commands and read commands containing Precharge commands at a predetermined interval to the rows of the BANKs where the segments of the cell are located.

18. The data packet access control method of claim 14, further comprising:

writing a data packet into an external queue in the external RAM by taking a cell as a unit, wherein segments of a same cell are written into different BANKs, each segment is in a same row; sequentially transmitting, by the memory control unit, active commands and write commands containing Precharge commands at a predetermined interval to the rows of the BANKs where the segments of the cell are located; and reading a data packet from an external queue in the external RAM by taking a cell as a unit, sequentially transmitting activate commands and read commands containing Precharge commands at a predetermined interval to the rows of the BANKs where the segments of the cell are located.

19. The data packet access control method of claim 15, further comprising:

writing a data packet into an external queue in the external RAM by taking a cell as a unit, wherein segments of a same cell are written into different BANKs, each segment is in a same row; sequentially transmitting, by the memory control unit, active commands and write commands containing Precharge commands at a predetermined interval to the rows of the BANKs where the segments of the cell are located; and reading a data packet from an external queue in the external RAM by taking a cell as a unit, sequentially transmitting activate commands and read commands containing Precharge commands at a predetermined interval to the rows of the BANKs where the segments of the cell are located.

20. The data packet access control method of claim 16, further comprising:

writing a data packet into an external queue in the external RAM by taking a cell as a unit, wherein segments of a same cell are written into different BANKs, each segment is in a same row; sequentially transmitting, by the memory control unit, active commands and write commands containing Precharge commands at a predetermined interval to the rows of the BANKs where the segments of the cell are located; and reading a data packet from an external queue in the external RAM by taking a cell as a unit, sequentially transmitting activate commands and read commands containing Precharge commands at a predetermined interval to the rows of the BANKs where the segments of the cell are located.

21. The data packet access control method of claim 17, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

22. The data packet access control method of claim 18, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

23. The data packet access control method of claim 19, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

24. The data packet access control method of claim 20, wherein the size of one cell is smaller than or equal to a product of a capacity of one row and the number of the BANKs, but is larger than or equal to a maximum data amount which can be read and written during a reading/writing time for one BANK and a precharge time of the BANK; and the predetermined interval is smaller than or equal to a bus time of the external RAM occupied by one row of data.

* * * * *